(12) United States Patent
Schoenfeld et al.

(10) Patent No.: US 9,926,237 B2
(45) Date of Patent: Mar. 27, 2018

(54) METHOD FOR PRODUCING A MOLDED BODY

(71) Applicant: Schunk Kohlenstofftechnik GmbH, Heuchelheim (DE)

(72) Inventors: Jeremias Schoenfeld, Huettenberg (DE); Roland Weiss, Huettenberg (DE); Gotthard Nauditt, Huettenberg (DE)

(73) Assignee: SCHUNK KOHLENSTOFFTECHNIK GMBH, Heuchelheim (DE)

( * ) Notice: Subject to any disclaimer, the term of this patent is extended or adjusted under 35 U.S.C. 154(b) by 33 days.

(21) Appl. No.: 14/828,092

(22) Filed: Aug. 17, 2015

(65) Prior Publication Data
US 2016/0052829 A1    Feb. 25, 2016

(30) Foreign Application Priority Data

Aug. 19, 2014 (DE) .................. 10 2014 216 433

(51) Int. Cl.
*B29C 63/02*    (2006.01)
*C23C 16/32*    (2006.01)
(Continued)

(52) U.S. Cl.
CPC ............ *C04B 35/78* (2013.01); *B01F 5/0619* (2013.01); *C04B 35/524* (2013.01);
(Continued)

(58) Field of Classification Search
CPC .......... B23B 5/00; B29C 63/02; C23C 16/325
See application file for complete search history.

(56) References Cited

U.S. PATENT DOCUMENTS 3,205,043 A * 9/1965 Taylor .................. C04B 35/573
                                                                 423/345
4,604,249 A * 8/1986 Luhleich .................. B22F 3/26
                                                                 264/29.5
(Continued)

FOREIGN PATENT DOCUMENTS

CN    1361755 A    7/2002
CN    101654361 A   2/2010
(Continued)

OTHER PUBLICATIONS

Onbattuvelli, Valmikanathan, P., et al., "The effects of nanoparticle addition on binder removal from injection molded silicon carbide". Ceramics International, 40 (2014) 13861-13868.*
(Continued)

*Primary Examiner* — Bret P Chen
(74) *Attorney, Agent, or Firm* — Quarles & Brady LLP

(57) ABSTRACT

The invention relates to a method for producing a molded body, having a silicon carbide support matrix and an integral carbon structure, wherein a base body on the basis of a powder mixture containing silicon carbide or silicon and carbon and of a binder is built in layers in a generative method, and wherein a pyrolysis of the base body is effected for realizing the molded body after the binder has been cured, wherein the carbon content of the carbon structure is adjusted by way of the pyrolysis of the binder and by way of the carbon content of the powder mixture or infiltration of a carbon material into the silicon carbide support matrix.

16 Claims, 4 Drawing Sheets

(51) Int. Cl.

| | | |
|---|---|---|
| *C04B 35/78* | (2006.01) | |
| *B01F 5/06* | (2006.01) | |
| *C04B 35/524* | (2006.01) | |
| *C04B 35/565* | (2006.01) | |
| *C04B 35/571* | (2006.01) | |
| *C04B 35/573* | (2006.01) | |
| *C04B 35/80* | (2006.01) | |
| *F23D 14/16* | (2006.01) | |
| *H05B 3/14* | (2006.01) | |
| *H05B 3/42* | (2006.01) | |

(52) U.S. Cl.
CPC ......... *C04B 35/565* (2013.01); *C04B 35/571* (2013.01); *C04B 35/573* (2013.01); *C04B 35/806* (2013.01); *F23D 14/16* (2013.01); *H05B 3/148* (2013.01); *H05B 3/42* (2013.01); *C04B 2235/3826* (2013.01); *C04B 2235/422* (2013.01); *C04B 2235/483* (2013.01); *C04B 2235/5436* (2013.01); *C04B 2235/5445* (2013.01); *C04B 2235/6026* (2013.01); *C04B 2235/614* (2013.01); *C04B 2235/616* (2013.01); *C04B 2235/652* (2013.01); *C04B 2235/80* (2013.01); *F23D 2203/106* (2013.01); *F23D 2212/105* (2013.01); *F23D 2213/00* (2013.01); *H05B 2203/024* (2013.01)

(56) References Cited

U.S. PATENT DOCUMENTS

| | | | | |
|---|---|---|---|---|
| 4,692,418 A | * | 9/1987 | Boecker | ................ C04B 35/565 423/345 |
| 4,942,145 A | * | 7/1990 | Moehle | ................ C04B 35/571 501/88 |
| 5,135,783 A | * | 8/1992 | Harvey | ................... B29C 67/24 428/1.2 |
| 2005/0151305 A1 | * | 7/2005 | Siegel | ................... C04B 35/573 264/640 |
| 2006/0216476 A1 | * | 9/2006 | Ganti | ..................... C23C 18/02 428/143 |
| 2011/0221084 A1 | * | 9/2011 | Goodman | ............ C04B 35/571 264/29.5 |

FOREIGN PATENT DOCUMENTS

| | | |
|---|---|---|
| DE | 3931181 A1 | 3/1991 |
| DE | 19730742 A1 | 1/1999 |
| DE | 19809657 A1 | 9/1999 |
| DE | 19809657 B4 | 3/2006 |
| WO | 2015055264 A2 | 4/2015 |

OTHER PUBLICATIONS

Gubernat, Agnieszka, et al., "SiC Products Formed by Slip Casting Method". Int. J. Appl. Ceram. Technol., 12 [5] 957-966 (2015).*

Yuan, Zhiyong, et al., "Effect of solid loading on properties of reaction bonded silicon carbide ceramics by gelcasting". RSC Adv., 2014, 4, 50386-50392.*

Onbattuvelli, Valmikanathan, et al., "Powder injection molding of SiC for thermal management". Tecnol. Metal. Mater. Miner., Sao Paulo, v.9, n.2, pp. 123-131, Apr.-Jun. 2012.*

The Patent Office of the People's Republic of China, First Notification of Office Action and Search Report, Application No. 201510512455.6, Mar. 23, 2017 [English Language Translation Only].

European Patent Office, Search Report, Application No. 15179824, Dec. 18, 2015.

* cited by examiner

Fig. 6
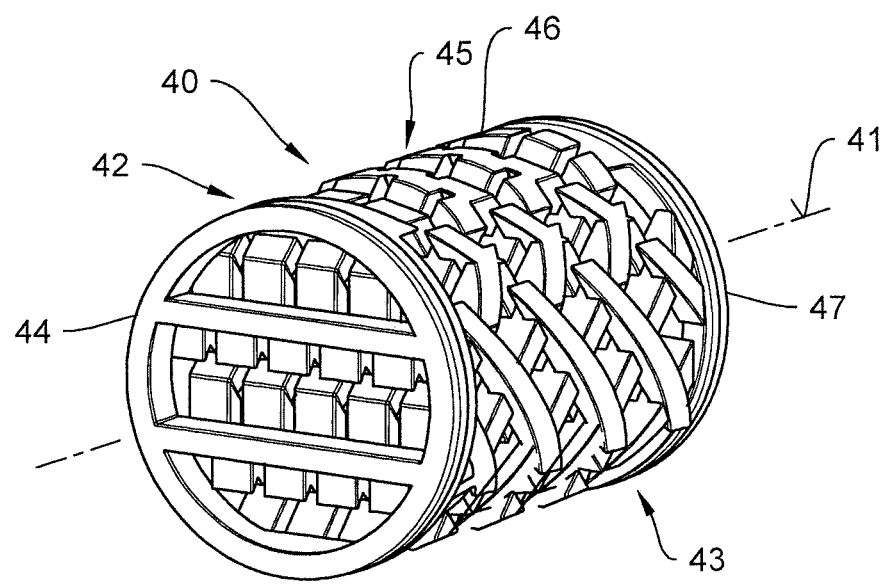
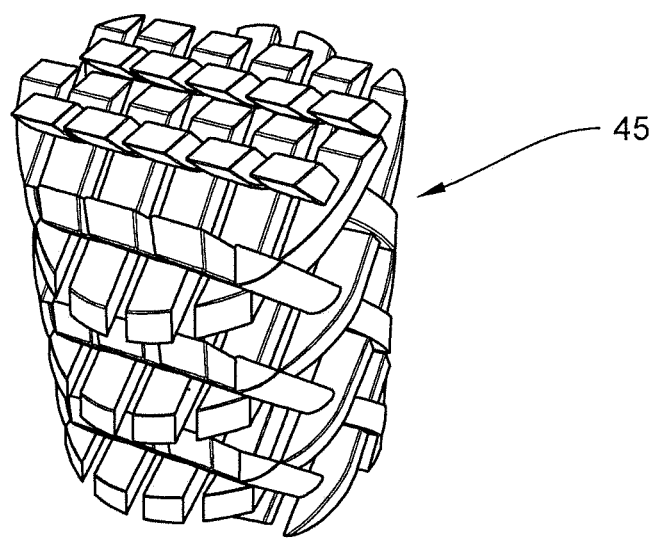
Fig. 7

METHOD FOR PRODUCING A MOLDED BODY

CROSS REFERENCE TO RELATED APPLICATION

This application claims the priority benefit of German Patent Application No. 10 2014 216 433.8 filed on Aug. 19, 2014, which is fully incorporated herein by reference.

STATEMENT REGARDING FEDERALLY SPONSORED RESEARCH OR DEVELOPMENT

Not applicable.

FIELD OF THE INVENTION

The present invention relates to a method for producing a molded body, having a silicon carbide support matrix and an integral carbon structure, wherein a base body on the basis of a powder mixture containing silicon carbide or silicon and carbon and of a binder is built in layers in a generative method, and wherein a pyrolysis of the base body is effected for realizing the molded body after the binder has been cured, wherein the carbon content of the carbon structure is adjusted by way of the pyrolysis of the binder and by way of the carbon content of the powder mixture or infiltration of a carbon material into the silicon carbide support matrix.

BACKGROUND OF THE INVENTION

Methods in which molded bodies are produced on the basis of a powdery or granular material and of a binder are also known by the term 3D printing, for the execution of which laser printing devices or so-called "multi-jet modeling" devices are, for instance, used in order to build the molded body in layers on the basis of preset design data.

In this regard, it is also known to furnish a base material, which serves to build the base body, with a binder, which is, for instance, configured as a phenolic resin and guarantees the dimensional stability of the molded body after curing.

SUMMARY OF THE INVENTION

The present invention is based on the task of proposing a method for producing a molded body that presents high mechanical stability, on the one hand, and can be adjusted with respect to its electrical or tribological properties, on the other hand.

The method in accordance with the invention allows for producing a molded body having a silicon carbide support matrix and an integral carbon structure, said molded body presenting high mechanical stability owing to the silicon carbide support matrix and being adjustable with respect to its electrical or tribological properties owing to the carbon structure that is realized so as to be integral.

In accordance with the invention, on the basis of a powder mixture containing silicon carbide or silicon and carbon and of a binder, a base body is initially built in a generative method, said base body being pyrolyzed in a following method step for realizing the molded body, such that the carbon content of the carbon structure is adjusted by way of the pyrocarbon that has been generated by way of a pyrolysis of the binder, is adjusted by way of the carbon content of the powder mixture and/or, where applicable, infiltration with another carbon material.

Within the context of the invention, the term carbon content is supposed to mean the free, which means uncombined, carbon in its entirety that realizes the carbon structure.

Preferably, the powder mixture presents a carbon content between 0 and 30% by weight, wherein the carbon content of the powder mixture is more likely in the area of the upper limit of the indicated area in the event that the powder mixture presents only a relatively little silicon carbide or no silicon carbide at all. It is particularly preferred if the powder mixture presents a carbon content between 10 and 20% by weight.

If the powder mixture presents an SiC particle fraction having particles of an average grain size $D_{s50}$ between 0.5 and 100 μm, a particularly thoroughly intermixed powder mixture is achieved. In addition, the desired physical properties of the molded body can be adjusted easily. Particularly good results can be obtained if the average grain size $D_{s50}$ is between 2 and 60 μm.

If for adjusting the carbon content of the molded body, following the pyrolysis of the base body, the infiltration of the silicon carbide support matrix with a carbon material being realized as a polymer is effected, said carbon material being transformed into carbon with the aid of a following pyrolysis, any free silicon that might still be present in the silicon carbide support matrix can simultaneously be transformed into silicon carbide for reinforcing the support matrix and any excess pyrocarbon can be used for realizing the carbon structure.

Alternatively, there is, as a matter of course, also the possibility to introduce the carbon into the base body as a soot suspension or also via vapor deposition of carbon, and to thus infiltrate said base body with carbon.

Carbon that has been introduced in such a manner may partially also serve to reinforce the silicon carbide support matrix, in a reactive firing with free silicon, which is contained in the silicon carbide support matrix, and partially be used for building the carbon structure.

Preferably, polymers containing silicon or containing silicon carbide are used as the polymer, such as siloxanes, silazanes, carbosiloxanes, carbosilazanes or carbosilanes.

Alternatively or in combination with the polymers that have previously been mentioned by way of example, prepolymers may also be used, such as polyimides and cyanate ester resins.

If phenolic resins, furan resins, cyanate ester resins are used as polymers, it is possible to simultaneously also use said polymers as a binder for building the base body.

If, in accordance with another advantageous variant of the method, an infiltration of the silicon carbide support matrix with silicon is effected following the pyrolysis, any free carbon that might be formed in the silicon carbide support matrix can be transformed into silicon carbide at least in part by way of a following reactive firing in order to obtain a carbon structure having the desired content of free carbon.

Preferably, the infiltration of the silicon carbide support matrix with silicon carbide is effected by way of vapor deposition of silicon carbide, wherein, in particular as a function of the desired infiltration depth, a CVI method or a CVD method may be utilized.

The further infiltration of the silicon carbide support matrix with silicon or silicon carbide that is carried out following the pyrolysis allows for encapsulating the carbon structure as a protection from corrosion and as a mechanical protection, wherein the infiltration of the support matrix with silicon may in particular be effected by immersing the molded body into liquid silicon or also by applying the "liquid silicon infiltration" method.

As an alternative to infiltration with silicon or also additionally to infiltration with silicon, an infiltration of the support matrix with silicon carbide may be effected, preferably by way of vapor separation of silicon carbide. According to requirements said continued encapsulation into silicon carbide may be effected by way of execution of a CVI method or CVD method, such that, in the case of the CVI method, in particular a deeper penetration of silicon carbide into the support matrix becomes possible, whereas the application of the CVD method more strongly allows for building a silicon carbide layer that encapsulates the outer contour of the molded body.

In another embodiment of the present invention, a molded body presents a silicon carbide support matrix and an integral carbon structure, having a base body that is built in layers in a generative method on the basis of a powder mixture containing silicon carbide or silicon and carbon and of a binder, wherein the molded body presents a carbon content of 10 to 30 percent by weight.

The molded body in accordance with the invention presents, owing to the silicon carbide support matrix, high mechanical stability and is defined with respect to its electrical or tribological properties by way of its carbon content. Here, in particular via the carbon content, which means the proportion of free carbon in the molded body, which realizes the integral carbon structure, the electrical conductivity of the molded body can be adjusted. Likewise, the solid lubricant behavior of the molded body may be influenced via the carbon content.

Preferably, the material for realizing the molded body presents a specific resistance between 150 and 800 µOhm. It is particularly preferred if the material for realizing the molded body presents a specific resistance between 300 and 600 µOhm.

In a particularly preferred embodiment, the molded body is structured so as to be shell-like, such that configurations of the molded body that are adapted to the technical use are possible, which means for instance a configuration as a bearing shell or as a sleeve-like heating element that can be heated electrically.

A porous and still particularly stable design is possible if the molded body is realized as a lattice structure.

The molded body in accordance with the invention is characterized by having particularly many uses, such that the molded body in accordance with the invention can advantageously be realized and used as a resistance heating element or also as a static mixer, which can in particular be utilized for homogenizing media flowing through the static mixer in the direction of a flow-through axis. Such static mixers may, for instance, be utilized as combustion zones of a porous burner, or also when creating synthetic gases.

An advantageous field of application of the molded body also consists in the use as a bearing body, wherein the solid lubricant properties of the carbon structure are employed.

A preferred variant of the method as well as various embodiments of molded bodies having been produced with the aid of the method will be explained in greater detail hereinafter using the drawings.

BRIEF DESCRIPTION OF THE DRAWINGS

In the figures.

FIG. 2 shows a schematic illustration of the texture of the resistance heating element being illustrated in FIG. 1;
FIG. 3 shows a silicon carbide support matrix;
FIG. 6 shows a molded body being realized as a static mixer;
FIG. 7 shows the lattice structure of the molded body.

DETAILED DESCRIPTION OF THE EXAMPLE EMBODIMENTS

Figure 1:
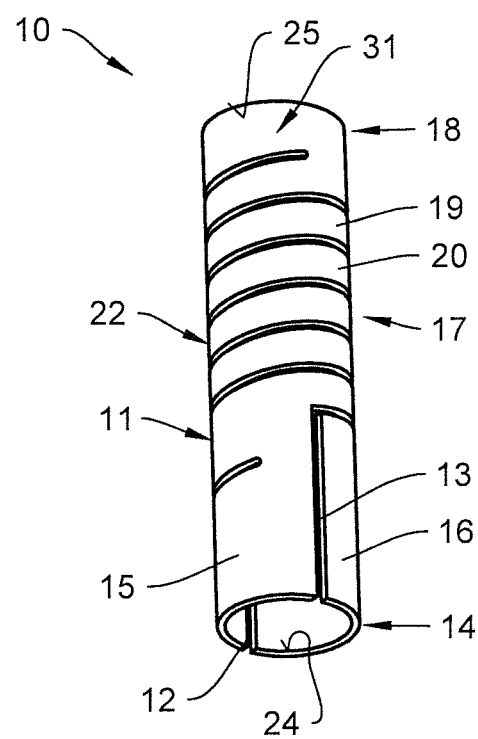
FIGS. 1 to 3 show a molded body being realized as a resistance heating element.

FIG. 1 shows a resistance heating element which is realized as a "tunnel heater", and which is realized so as to be tubular, and to have a round circular cross-section. The resistance heating element presents a molded body 22 having a thin tube wall 11, which includes apertures in the form of two slits 12 and 13. The slits 12 and 13 are realized, in the area of a lower end 14 of the resistance heating element 10, so as to be straight in the longitudinal direction of the same, in this way forming two connection faces 15 and 16 for connection of the resistance heating element 10 to connecting contacts of a connection apparatus not being illustrated in greater detail here.

In a central area 17 of the molded body 22, the slits 12 and 13 in each instance run helically in the longitudinal direction along the circumference of the tube wall 11 up to an upper end 18 of the resistance heating element. The slits 12 and 13 in this way form two heating coils 19 and 20, which are linked to each other at their upper end in an annular portion 32. The resistance heating element is heated during operation substantially in the area of the heating coils 19 and 20. The resistance heating element is realized in one piece and substantially consists of silicon carbide and carbon.

Figure 2:
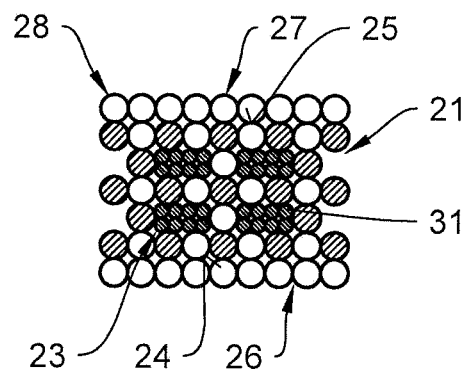

FIG. 2 shows a schematic enlarged illustration of a part of a texture cross-section of the molded body 22 being illustrated in FIG. 1. The texture presents a silicon carbide support matrix 21, wherein a carbon structure 23 is integrated into the silicon carbide support matrix 21. An inner wall surface 24 and an outer wall surface 25 are furnished with a silicon carbide coating 26 or 27.

Figure 3:
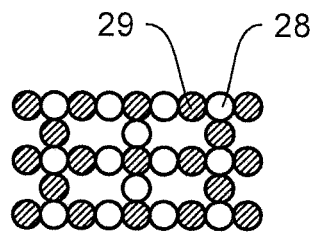
Figure 4:
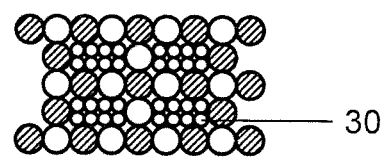
FIG. 4 shows the texture being illustrated in FIG. 3, with a polymer being realized as a phenolic resin and being infiltrated into the support matrix.
Figure 5:
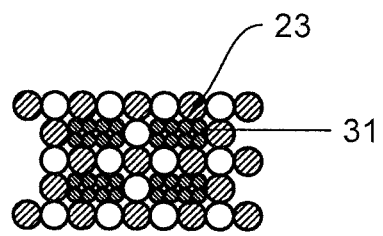
FIG. 5 shows the texture being illustrated in FIG. 4 after a pyrolysis has been carried out for transforming the polymer into pyrolysis carbon.

In FIGS. 3 to 5, using texture illustrations, the successive method steps for producing the texture of the molded body 22 being illustrated in FIG. 2 are explained by way of example.

FIG. 3 shows the texture of a base body presenting silicon carbide particles 28, which are linked to one another via binding agent particles 29. The base body obtains its dimensional stability by way of the cured binding agent particles 29.

FIG. 4 shows the texture having polymer particles 30 which are integrated into the silicon carbide support matrix 21 of the base body, and which are, for instance, formed from a phenolic resin.

FIG. 5 shows the polymer particles 30 which have been transformed into carbon particles 31 after a pyrolysis procedure, and which realize the carbon structure 23 in the silicon carbide support matrix 21.

Finally, a coating with silicon carbide particles 28 is effected with the CVD method for realizing the silicon carbide coating 26 being illustrated in FIG. 2 on the inner wall surface 24 and for realizing the silicon carbide coating 27 on the outer wall surface 25 of the resistance heating element 10.

FIG. 6 shows a molded body 40 which is realized as a static mixer, and which is furnished with an electrical connection unit 44 at each of its axial ends 42, 43 in relation to a flow-through axis 41, said unit being formed from a graphite material in the present case, and serving to feed an electrical current into or out of the molded body 40.

The molded body 40 being realized as a static mixer presents a three-dimensional lattice structure 45, which is formed from interlaced material crosspieces 46, 47 of the molded body 40. Here, as FIG. 7 in particular shows, which illustrates the molded body 40 without any connection units 44, the material crosspieces 46, 47 extend in interpenetrative crosspiece planes 48, 49. As a result of the lattice structure 45 being built in layers in generative method, which means for example a 3D printing method, the material crosspieces 46, 47 are linked to one another in one piece.

Figure 8:
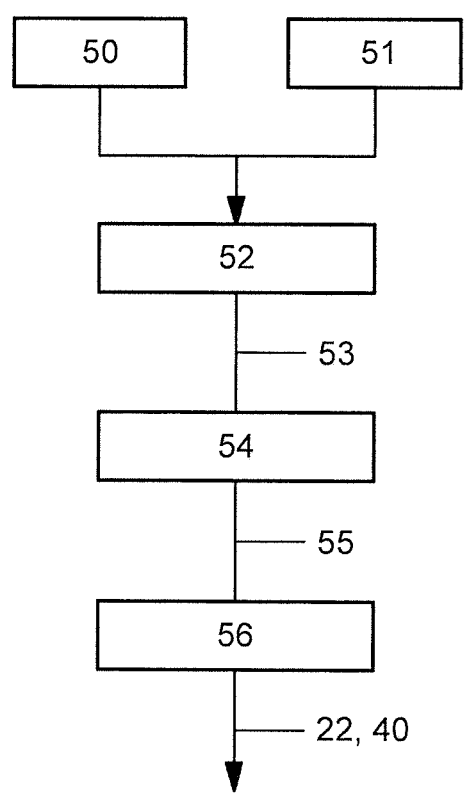
FIG. 8 shows a schematic illustration of a method for producing a molded body.

By way of example, FIG. 8 shows a method for producing the molded bodies 22, 40 which are illustrated in FIGS. 1 and 6, 7, and which are, by way of example, configured as a resistance heating element (FIG. 1) or as a static mixer (FIG. 6).

The method being illustrated in FIG. 8 starts from the production of a powder mixture 50, which may present proportions of silicon carbide or silicon and carbon or silicon carbide and silicon and carbon and to which, as a binder 51, a synthetic resin containing carbon, such as phenolic resin, is added, such that a homogenized mixture 53 is subsequently produced in a homogenizing stage 52, said mixture being supplied to a 3D printing unit 54 and being transformed into a base body 55 in a layer building process, which base body is subjected to a pyrolysis 56 after curing in a furnace working. As a result of the pyrolysis, the binder 51 is transformed into carbon and any carbon and silicon proportions of the powder mixture 50 are equally transformed into silicon carbide by way of a reactive firing.

The result of the pyrolysis is a mechanically stable molded body 22, 40, whose proportion of free carbon for realizing a carbon structure is determined by the composition of the powder mixture 50 or by a residue proportion of free carbon remaining after a reactive firing of silicon and carbon.

Any free carbon proportions which might have remained at the surface of the molded body 22, 40, and which are not present in an encapsulated form in the silicon carbide support matrix, can be transformed, after an infiltration with silicon, into silicon carbide in a subsequent reactive firing that might be carried out in a further furnace working.

In order to preclude that there is any free silicon in the silicon carbide support matrix or at the surface of the molded body after the reactive firing, in a further furnace working, the free silicon can be evaporated in a vacuum atmosphere.

The invention claimed is:

1. A method for producing a molded body having a silicon carbide support matrix and an integral carbon structure, said method comprising:

building a layered base body using a generative method from a powder mixture containing carbon, a binder, and at least one of silicon and silicon carbide;

curing the binder; and pyrolyzing the base body including the binder after the binder has been cured to form the molded body, said pyrolyzing forming a silicon carbide support matrix and an integral carbon structure, wherein a carbon content of the carbon structure is defined by a free carbon in its entirety and is adjusted by way of the pyrolysis of the binder and by way of the carbon content of the powder mixture or infiltration of a carbon material into the silicon carbide support matrix.

2. The method according to claim 1, in which the powder mixture presents a carbon content between 0 and 30% by weight.

3. The method according to claim 2, in which the powder mixture presents a carbon content between 10 and 20% by weight.

4. The method according to claim 1, in which the powder mixture presents an SiC particle fraction having particles of an average grain size $D_{s50}$ between 0.5 and 100 μm.

5. The method according to claim 4, in which the average grain size $D_{s50}$ is between 2 and 60 μm.

6. The method according to claim 5, in which the average grain size $D_{s50}$ is between 3 and 10 μm.

7. The method according to claim 1, in which for adjusting the carbon content of the molded body, following the pyrolysis of the base body, the infiltration of the silicon carbide support matrix with a polymer is effected, said polymer being transformed into carbon with the aid of a following pyrolysis.

8. The method according to claim 7, in which the polymer comprises a polymer containing silicon or silicon carbide.

9. The method according to claim 7, in which prepolymers are used as the polymer.

10. The method of claim 9, wherein the prepolymers are selected from the group consisting polyimides, and cyanate ester resins.

11. The method according to claim 7, in which phenolic resins, furan resins, cyanate ester resins are used as the polymer.

12. The method of claim 7, wherein the polymers are selected from the group consisting of siloxanes, silazanes, carbosiloxanes, carbosilazanes, and carbosilanes.

13. The method according to claim 1, in which an infiltration of the silicon carbide support matrix with silicon is effected following the pyrolysis.

14. The method according to claim 1,
in which an infiltration of the silicon carbide support matrix with silicon carbide is effected following the pyrolysis.

15. The method according to claim 14, in which the infiltration of the silicon carbide support matrix with silicon carbide is effected by way of vapor deposition of silicon carbide.

16. The method according to claim 15, in which the vapor deposition of silicon carbide is effected in a CVI method or CVD method.

* * * * *